United States Patent
Glenn, III et al.

(10) Patent No.: US 11,248,627 B2
(45) Date of Patent: Feb. 15, 2022

(54) APPARATUS AND METHODS TO DEPLOY A FLUID FLOW CHANNEL

(71) Applicant: The Boeing Company, Chicago, IL (US)

(72) Inventors: Richard J. Glenn, III, Lynnwood, WA (US); Steve G. Mackin, Bellevue, WA (US); Kyle J. Johnson, Seattle, WA (US); Austin J. Snider, Seattle, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 16/598,817

(22) Filed: Oct. 10, 2019

(65) Prior Publication Data
US 2020/0040911 A1 Feb. 6, 2020

Related U.S. Application Data

(63) Continuation of application No. 15/296,857, filed on Oct. 18, 2016, now Pat. No. 10,465,711.

(51) Int. Cl.
*B64D 41/00* (2006.01)
*F04D 29/54* (2006.01)
(Continued)

(52) U.S. Cl.
CPC ............ *F04D 29/547* (2013.01); *B64C 25/10* (2013.01); *B64D 41/007* (2013.01); *F04D 29/522* (2013.01)

(58) Field of Classification Search
CPC ........ F04D 29/522; F04D 29/547; F03D 5/02; B64D 33/02
See application file for complete search history.

(56) References Cited

U.S. PATENT DOCUMENTS 3,887,817 A * 6/1975 Steelman .............. F03B 17/066
290/43
4,121,606 A * 10/1978 Holland ................. B64D 33/02
137/15.1
(Continued)

FOREIGN PATENT DOCUMENTS

DE 21614 3/1883
DE 25332 1/1884
(Continued)

OTHER PUBLICATIONS

European Patent Office, European Search Report, in connection with EP Application Serial No. EP 14187318, dated Feb. 12, 2015, 2 pages.

(Continued)

*Primary Examiner* — Philip J Bonzell
*Assistant Examiner* — Tye William Abell
(74) *Attorney, Agent, or Firm* — Hanley, Flight & Zimmerman, LLC

(57) ABSTRACT

Apparatus and methods to deploy a fluid flow channel are disclosed herein. An example apparatus includes a first loop coupled to an outside surface of a vehicle via a first fastener, a second loop coupled to the vehicle and disposed a distance from the first loop, and a flexible material having a first end coupled to the first loop and a second end coupled to the second loop, where the flexible material is to form a fluid flow channel between the first loop and the second loop.

20 Claims, 10 Drawing Sheets

(51) Int. Cl.
  *F04D 29/52* (2006.01)
  *B64C 25/10* (2006.01)

(56) References Cited

U.S. PATENT DOCUMENTS

| | | | |
|---|---|---|---|
| 4,533,095 A * | 8/1985 | Yates | B64D 33/02 244/12.5 |
| 4,533,098 A | 8/1985 | Bonini et al. | |
| 4,641,678 A | 2/1987 | Haas et al. | |
| 6,142,417 A * | 11/2000 | Figge, Sr. | B64D 33/02 137/15.1 |
| 9,452,721 B2 | 9/2016 | Mackin | |
| 9,644,605 B2 | 5/2017 | Mackin et al. | |
| 2003/0066934 A1 | 4/2003 | Bolonkin | |
| 2006/0102781 A1* | 5/2006 | Hein | F02C 7/32 244/58 |
| 2008/0303285 A1* | 12/2008 | Bondhus | F03B 17/066 290/54 |
| 2009/0212594 A1 | 8/2009 | Breidenbach | |
| 2009/0285681 A1* | 11/2009 | Ahrens | F03D 5/00 416/1 |
| 2013/0248657 A1* | 9/2013 | Riordan | B64D 41/007 244/53 B |
| 2015/0091375 A1* | 4/2015 | Mackin | F03D 5/02 307/9.1 |
| 2016/0160841 A1* | 6/2016 | Mackin | F03D 5/02 290/55 |
| 2016/0186717 A1 | 6/2016 | Santos | |
| 2016/0305247 A1 | 10/2016 | Freda et al. | |
| 2018/0093779 A1 | 4/2018 | Ainslie | |
| 2018/0106273 A1 | 4/2018 | Glenn, III et al. | |

FOREIGN PATENT DOCUMENTS

| | | |
|---|---|---|
| EP | 1878916 | 1/2008 |
| FR | 2736101 | 1/1997 |
| FR | 2970525 | 7/2012 |
| GB | 2480454 | 11/2011 |
| WO | 2012067533 | 5/2012 |
| WO | 2012098314 | 7/2012 |

OTHER PUBLICATIONS

European Patent Office, "Extended European Search Report," issued in connection with European Patent Application No. 17196906.6, dated Dec. 19, 2017, 8 pages.

European Patent Office, "Communication Pursuant to Article 94(3) EPC", issued in connection with European Patent Application No. 17196906.6 dated Feb. 4, 2019, 4 pages.

United States Patent and Trademark Office, "Non-Final Office Action", issued in connection with U.S. Appl. No. 15/296,857 dated Feb. 5, 2019, 13 pages.

United States Patent and Trademark Office, "Notice of Allowance and Fee(s) Due", issued in connection with U.S. Appl. No. 15/296,857 dated Jun. 27, 2019, 8 pages.

The Israel Patent Office, "Notification of Deficiencies," issued in connection with Israeli Patent Application No. 253645, dated Dec. 28, 2020, 16 pages.

Korean Intellectual Property Office, "Notice to File a Response," issued in connection with Korean Appl. No. 10-2017-0134715, dated Nov. 16, 2021, 10 pages.

* cited by examiner

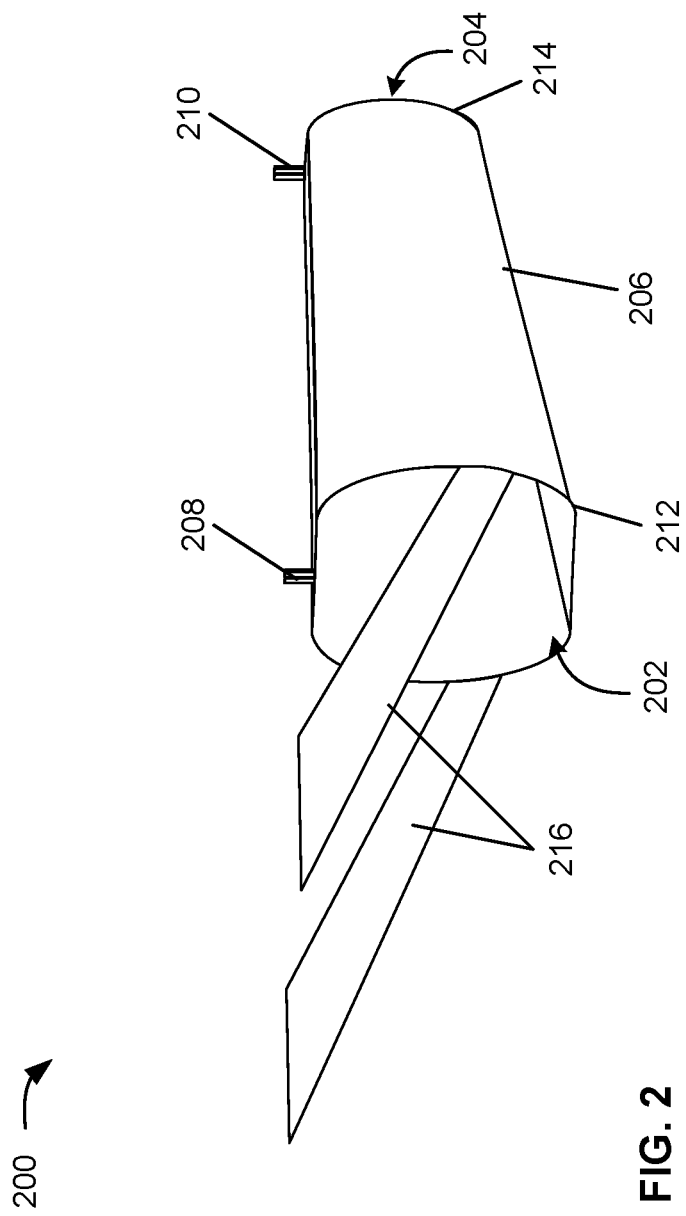

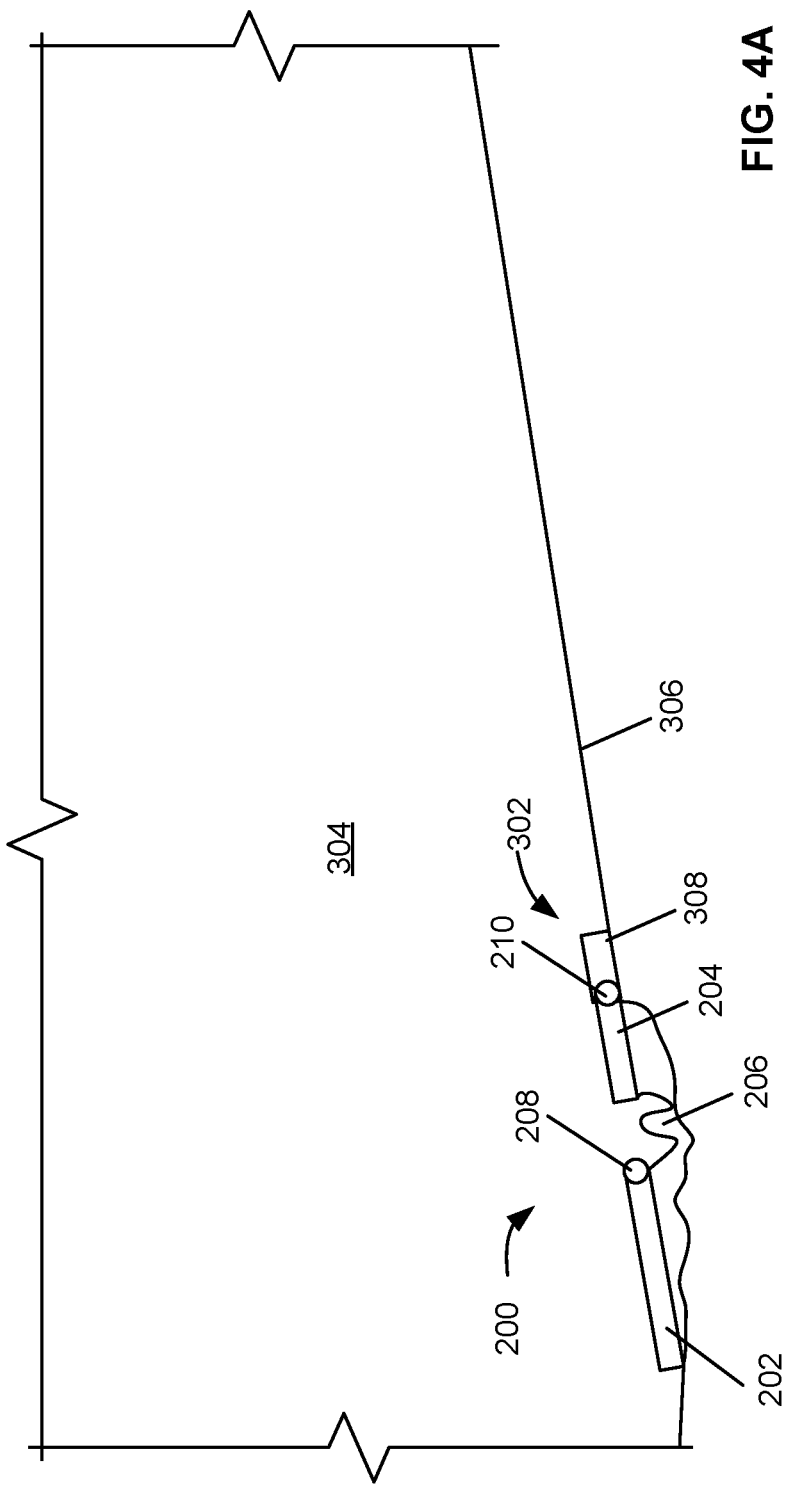

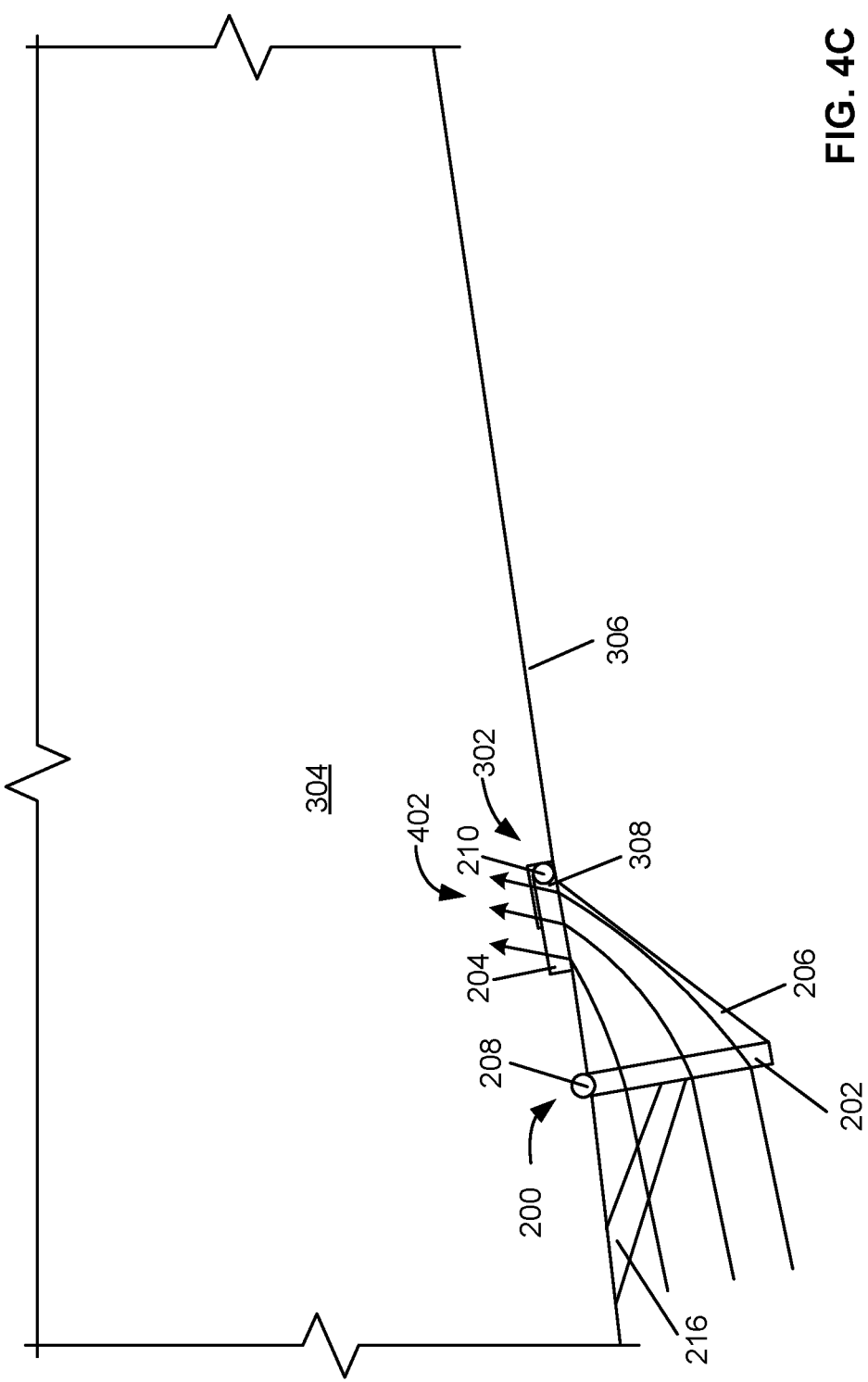

APPARATUS AND METHODS TO DEPLOY A FLUID FLOW CHANNEL

RELATED APPLICATION

This patent arises as a continuation of U.S. patent application Ser. No. 15/296,857, which was filed on Oct. 18, 2016. U.S. patent application Ser. No. 15/296,857 is hereby incorporated herein by reference in its entirety. Priority to U.S. patent application Ser. No. 15/296,857 is hereby claimed.

FIELD OF THE DISCLOSURE

This disclosure relates generally to fluid flow channels and, more particularly, to apparatus and methods to deploy a fluid flow channel.

BACKGROUND

In some situations, a vehicle, such as an aircraft, may lose power during operation. Upon loss of power, an emergency power generator may be deployed to generate power. The design of the emergency power generator may vary based on the type of vehicle with which the emergency power generator is implemented. For example, ram air turbines may be used with some types of aircraft. In some examples, the ram air turbine may be implemented with a nozzle to concentrate and increase a velocity of the air flow toward the ram air turbine, thus increasing the power generated by the ram air turbine.

SUMMARY

An example apparatus includes a first loop coupled to an outside surface of a vehicle via a first fastener, a second loop coupled to the vehicle and disposed a distance from the first loop, and a flexible material having a first end coupled to the first loop and a second end coupled to the second loop, where the flexible material is to form a fluid flow channel between the first loop and the second loop.

An example method includes deploying a first loop adjacent to a surface on a vehicle deploying a second loop adjacent to the surface on the vehicle, the second loop to be deployed in a first position, wherein the second loop is to move to a second position after deployment.

BRIEF DESCRIPTION OF THE DRAWINGS

FIG. 2 is a diagram of an example apparatus that may be implemented on an aircraft.

FIGS. 4A-4C depict an alternative deployment and use of the example apparatus described herein.

The figures are not to scale. Wherever possible, the same reference numbers will be used throughout the drawing(s) and accompanying written description to refer to the same or like parts.

DETAILED DESCRIPTION

The example apparatus described herein may be implemented with an emergency power generator of a vehicle (e.g., an air turbine) to increase the power output of the emergency power generator. The example apparatus may be operative to channel a flow of a fluid toward the emergency power generator and/or increase a velocity of the flow of the fluid. The example apparatus described herein may be a deployable nozzle including a first loop coupled to an outside surface of a vehicle via a first fastener, a second loop coupled to the vehicle and disposed a distance from the first loop, and a flexible material having a first end coupled to the first loop and a second end coupled to the second loop. The flexible material forms a fluid flow channel between the first loop and the second loop. The flexible material may include nylon, silk, synthetic fibers, or any combination thereof. The fluid flow channel is tapered to increase a velocity of a fluid flow between the first loop and the second loop. The first loop defines a first area and the second loop defines a second area smaller than the first area. The first loop may be deployed in response to an emergency condition.

The second loop may be coupled to the vehicle via a second fastener to enable the second loop to rotate relative to the vehicle. The first and second loops are stored in an interior of the vehicle prior to being deployed. The first and second loops rotate at different rates due to the difference in size between the first and second loops. In some examples, the rate of rotation of the second loop is based on a velocity of the fluid through the fluid flow channel. That is, after the first loop is deployed, the fluid flow may cause the second loop to rotate at a rate defined by the velocity of the fluid flow. The second loop may be disposed in a track and may translate within the track based on the flow of fluid through the fluid flow channel. One or more tension lines extending from the vehicle to the first loop prevent the first loop from rotating more than ninety degrees away from the vehicle. The fluid flow channel may be coupled, via the second loop, to an interior of the vehicle. In some examples, the fluid flow channel is directly coupled to the interior of the vehicle. In other examples, the fluid flow channel is coupled to the interior of the vehicle using an additional fluid flow channel.

Figure 1:
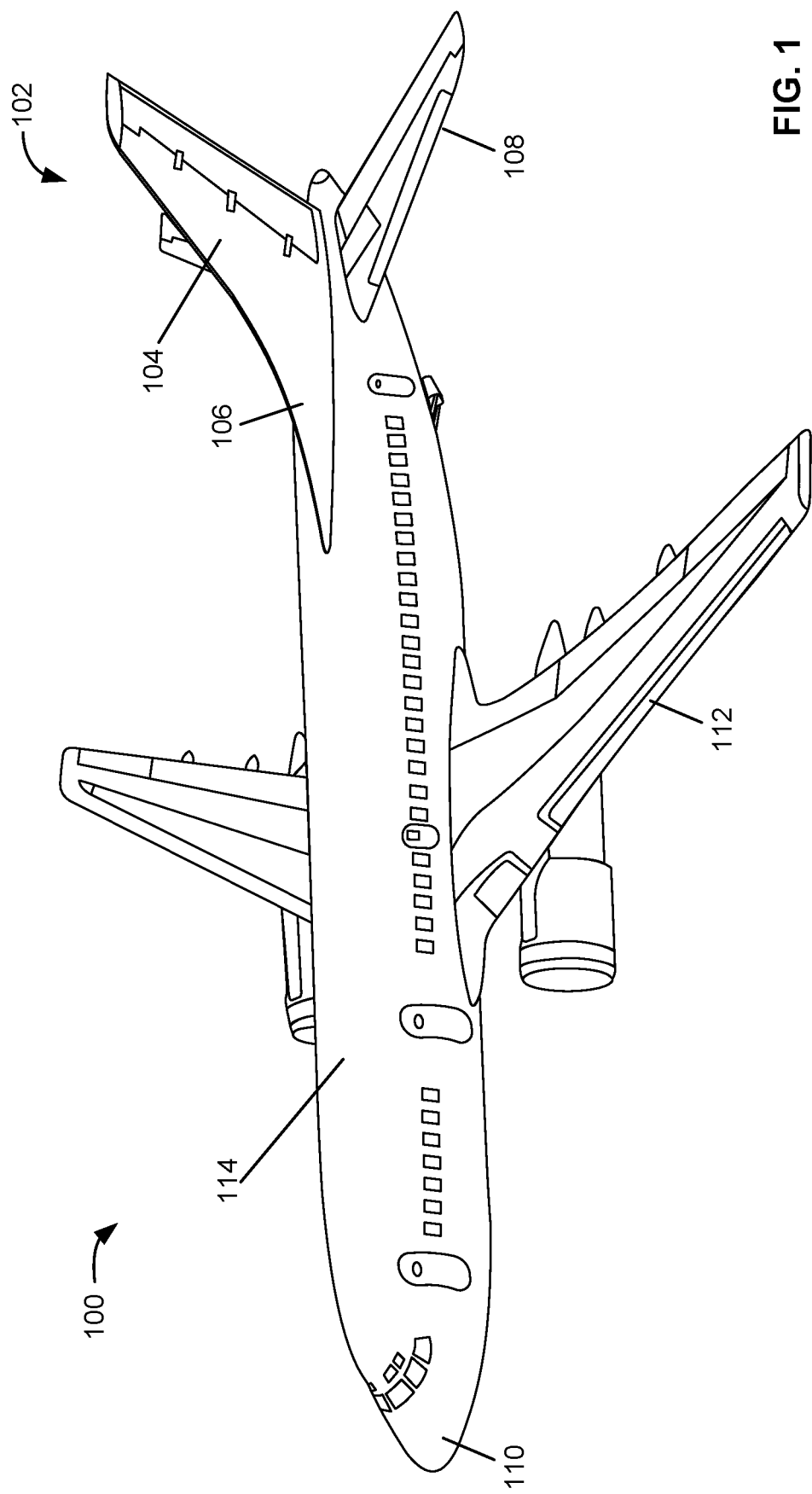
FIG. 1 represents an example environment in which the apparatus disclosed herein may be implemented.

FIG. 1 illustrates an example aircraft 100 with which the example apparatus disclosed herein may be implemented. The aircraft 100 of the illustrated example includes a tail section 102 including a vertical fin 104 adjacent to a dorsal fairing 106, horizontal stabilizers 108, a nose section (e.g., a cockpit section) 110 and wings 112 attached to a fuselage 114. The examples described herein may be applied to surfaces and/or features (e.g., riblets) of any of the tail section 102, the nose section 110, the stabilizers 108, the wings 112 and/or the fuselage 114, or any other exterior or outboard structure (e.g., a wing strut, an engine strut, a canard stabilizer, etc.) and/or surface.

FIG. 2 is a diagram of an example apparatus 200 that may be implemented on a vehicle, such as the aircraft 100. Alternatively, the example apparatus 200 may be implemented with other types of vehicles. The example apparatus 200 includes a first loop 202 and a second loop 204 defining a fluid flow channel 206. The first loop 202 of the example apparatus 200 is larger than the second loop 204. The first and second loops 202, 204 crate a tapered flow channel to increase the velocity of the fluid flow through the fluid flow channel 206. In some examples, the ratio of an area of the first loop 202 to an area of the second loop 204 is 2:1. Alternatively, the ratio may be different and/or the ratio may be variable. That is, the area of the first loop 202 and/or the second loop 204 may be changed during operation of the aircraft 100 based on, for example, a speed of the aircraft 100, a velocity of the airflow through the fluid flow channel 206, etc. In such examples, the first and second loops 202, 204 may be made of a flexible material, such as wire, flexible plastic, etc. to enable the loops 202, 204 to be expanded or contracted.

The example apparatus 200 also includes a first fastener 208 and a second fastener 210 coupled to the respective first and second loops 202, 204. The first fastener 208 (e.g., a pivot) may be operative to pivot or rotate the first loop between a storage position within a storage area (e.g., storage area 302 of FIG. 3) and a deployed position. The second fastener 210 may be optative to rotate and/or translate to move the second loop 204 between a storage positon within the storage area 302 and a deployed position. In some examples, the first and second fasteners 208, 210 may be operative to lock the respective first and second loops 202, 204 in the storage area 302. In such examples, upon unlocking, the first and second fasteners 208, 210 enable the first and second loops 202, 204 to deploy. The first and second loops 202, 204 may pivot or rotate at different rates due to the difference in size of the first and second loops 202, 204. For example, as the first loop 202 rotates, the second loop 204 rotates at a different speed such that the fluid flow channel 206 is properly deployed. In some examples, the rotation or pivoting of the first and second loops 202, 204 is controlled. Alternatively, the first loop 202 and/or the second loop 204 are able to rotate freely and, thus, rotate or pivot at a rate that is based on the velocity of the fluid flow through the fluid flow channel 206.

The fluid flow channel 206 may be made of a flexible, durable fabric, such as silk, nylon, synthetic fabric, etc. A first end 212 of the fluid flow channel 206 is coupled to the first loop 202 and a second end 214 of the fluid flow channel 206 is coupled to the second loop 204. As the first and second loops 202, 204 are deployed, the fluid flow channel 206 is formed. The fluid flow channel 206 is shaped to direct fluid flow (e.g., air flow) to, for example, an emergency power generator. In some examples, the fluid flow may be directed to an interior of the aircraft 100 to provide additional air to one or more of the aircraft systems (e.g., an air compressor). In examples in which the first and second loops 202, 204 are adjustable, the first and second ends 212, 214 may include elastic to enable the material forming the fluid flow channel 206 to grow and contract along with the first and second loops 202, 204.

The example apparatus 200 may also include tension lines 216 attached to the first loop 202. The tension lines 216 may be made of the same material as the fluid flow channel 206 so that the tension lines 216 are lightweight, durable and flexible. The tension lines 216 may be designed and/or sized such that, when the fluid flow channel 206 is deployed, the first loop 202, and thus the second loop 204, are not rotated more than 90 degrees from an initial position and/or from the aircraft 100. The tension lines 216 enable the fluid flow channel 206 to maintain a position to direct fluid flow to a designated area (e.g., an emergency power generator). In some examples, the tension lines 216 may be made of a different flexible and durable material.

Figure 3A:
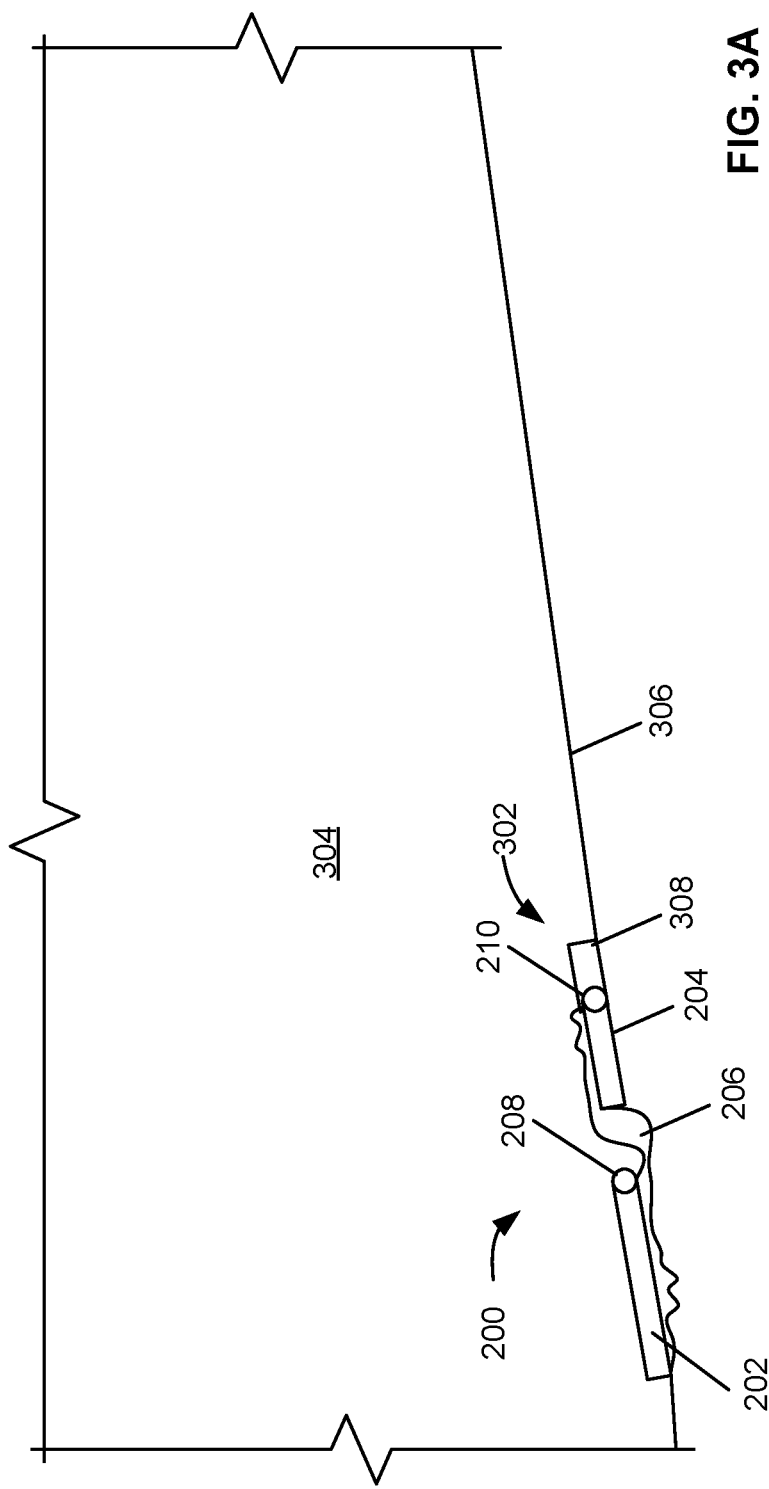
FIGS. 3A-3D depict a deployment and use of the example apparatus described herein.

FIGS. 3A-3D depict a deployment and use of the example apparatus 200 described herein. In FIG. 3A, the apparatus 200 is in a storage position within the aircraft 100. The apparatus 200 may be stored in a storage area 302 in a substantially flat orientation. The storage area 302 may be a portion of an interior 304 of the aircraft 100 (e.g., a cabin, a cargo area, a mechanical compartment, etc.) or may be a separate area disposed adjacent to a surface of the aircraft 100. In examples in which the apparats 200 is implemented with the example airplane 100, the storage area 302 may be located adjacent to a surface 306 of the aircraft 100, such as a surface of the wing 112, a surface of the fuselage 114, a surface of the tail section 102, etc.

Figure 3B:
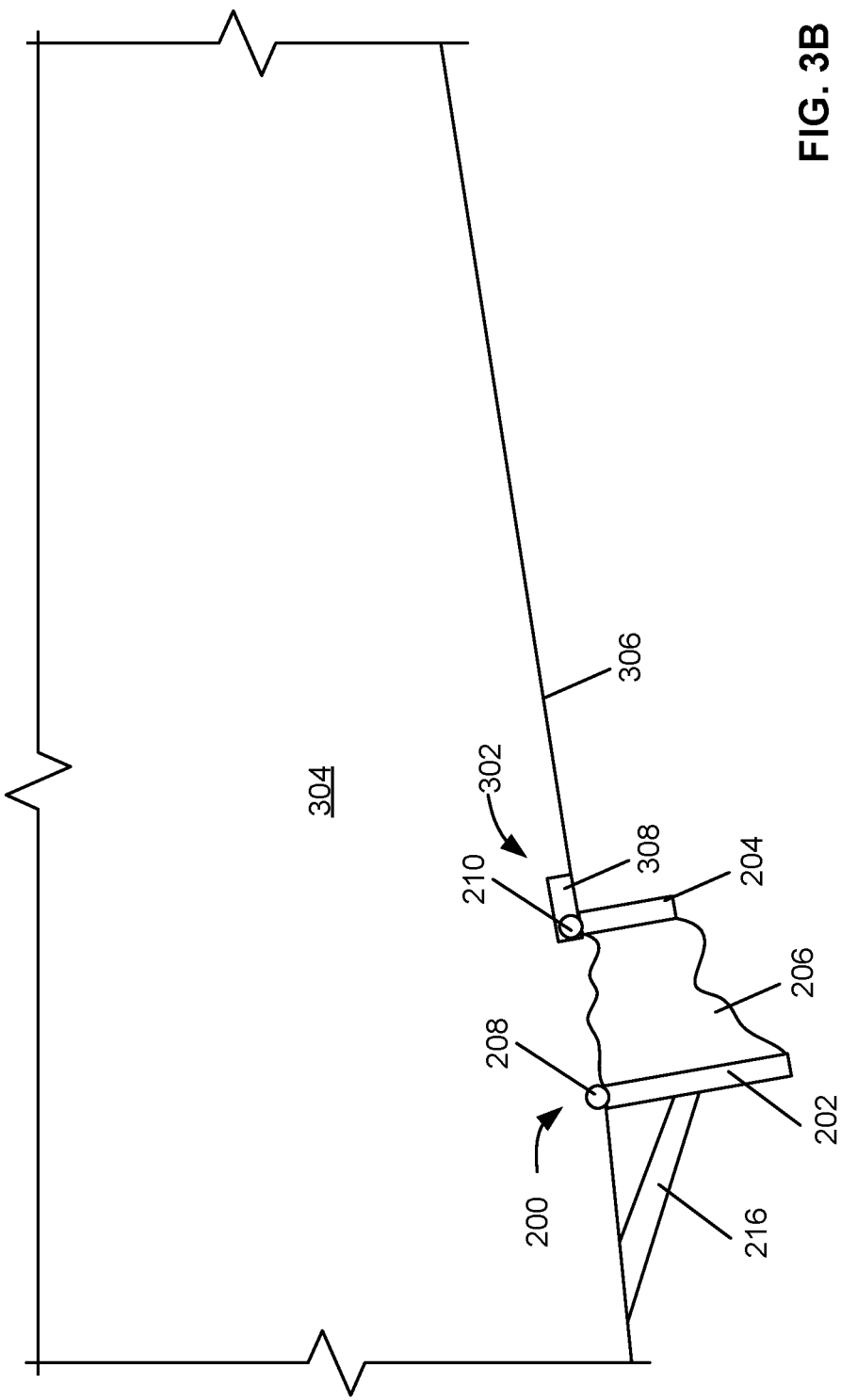

In FIG. 3B, the first loop 202 has been rotated from the storage position to a deployed positon. The second loop 204 has rotated from the storage positon and is in a partially deployed position. The second loop moves along the track 308 to a fully deployed position based on a fluid flow through the fluid flow channel 206. The fluid flow channel 206 (e.g., a nozzle) is formed when the second loop 204 has moved to the fully deployed position. The tension lines 216 are coupled to the first loop 202 to prevent the first loop 202 from rotating past the deployed positon. Maintaining the first loop 202 in the deployed positon prevents the second loop 204 from over-rotating and, thus, the fluid flow channel 206 stays in the deployed position.

Figure 3C:
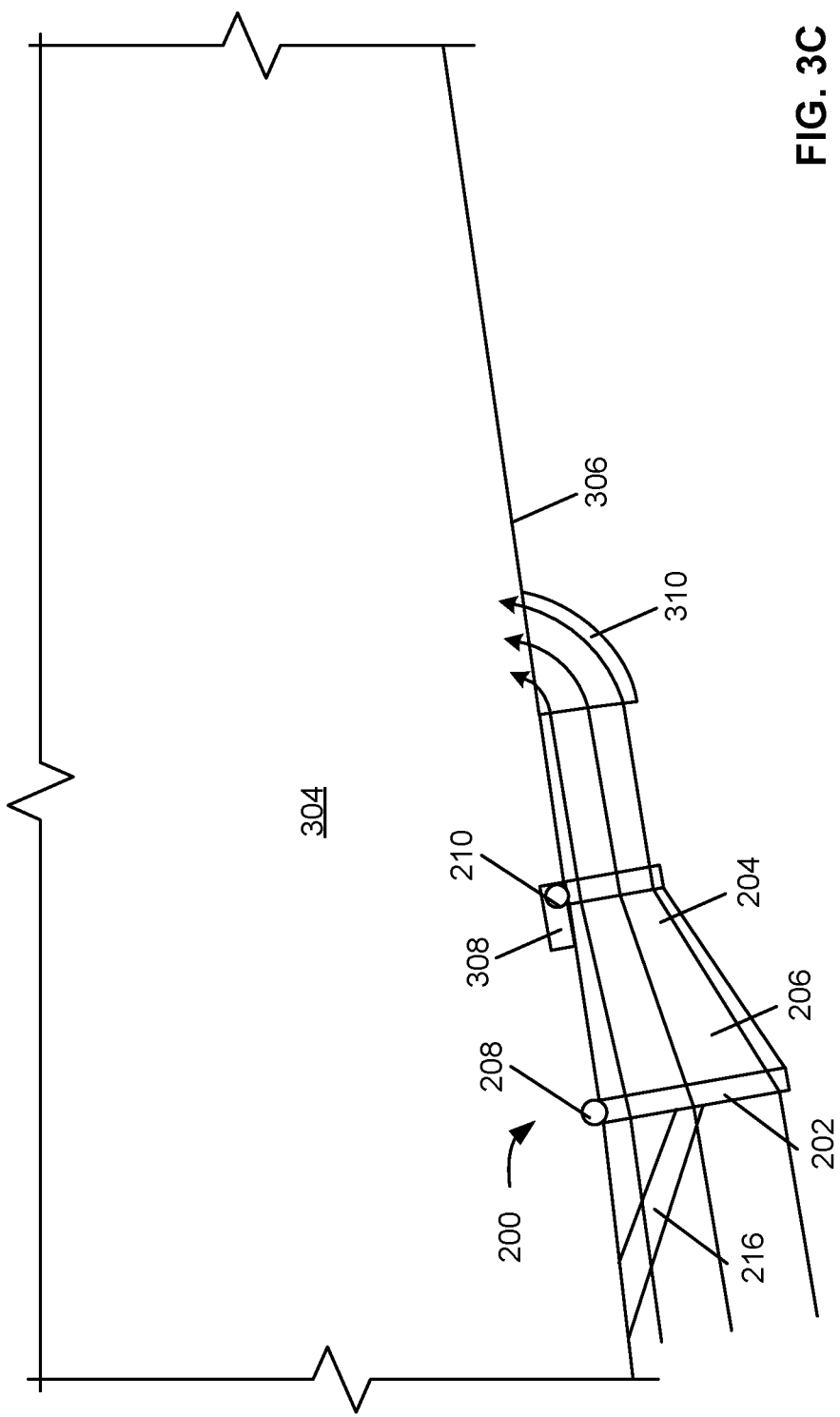
Figure 3D:
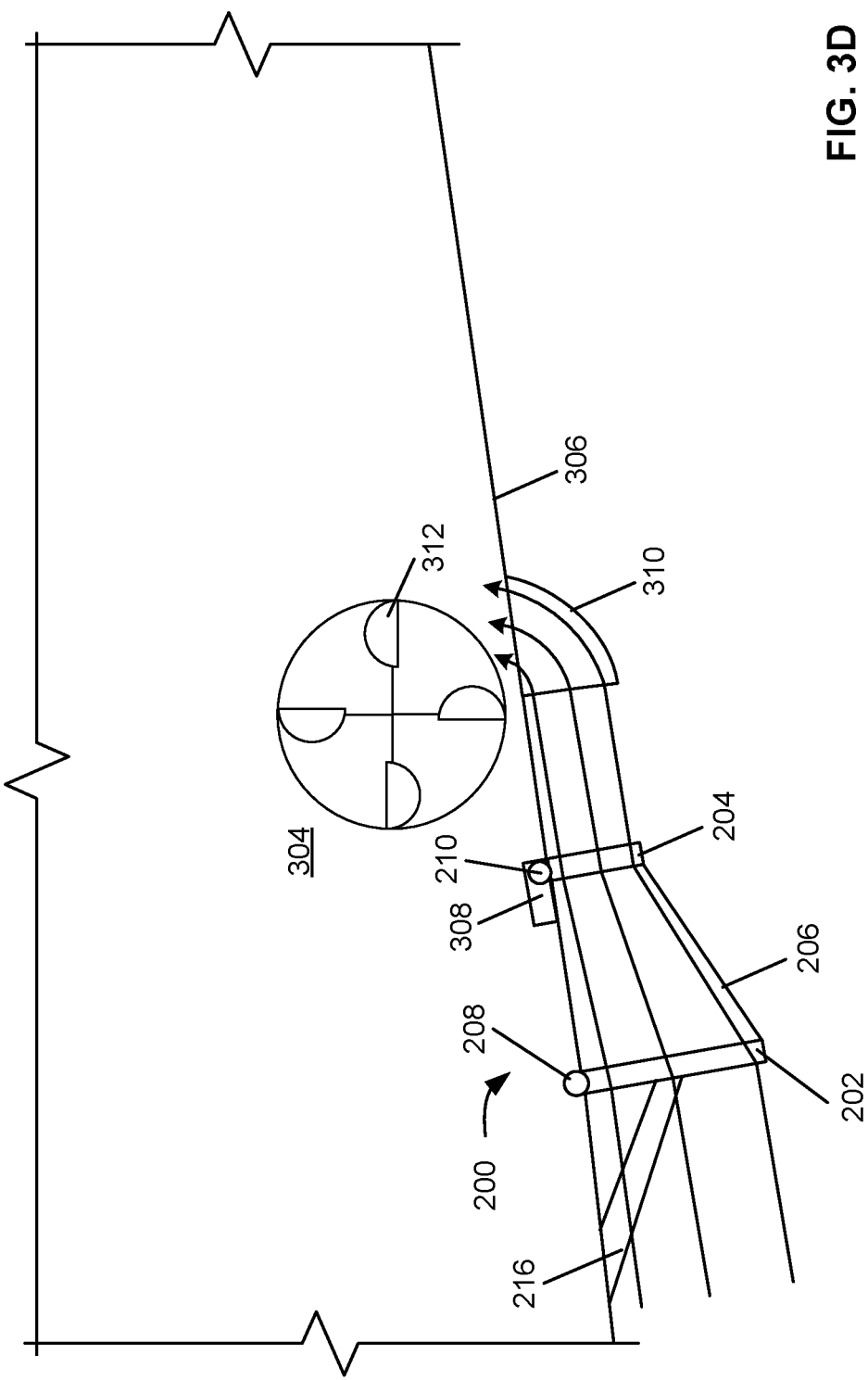

FIG. 3C depicts a fluid flow path that the fluid flow may take through the fluid flow channel 206. In this illustrated example, an additional flow control device 310 has been attached to the surface 306 of the aircraft 100 to direct the flow of the fluid into the interior 304 of the aircraft 100. As shown in FIG. 3D, the flow control device 310 may direct fluid flow to an emergency power generator 312 disposed within the interior 304 of the aircraft 100. In other examples, the flow control device 310 may not be included on the surface 306 of the aircraft 100 and the fluid flow channel 206 directs the flow of the fluid to an emergency power generator disposed external to the surface 306 of the aircraft 100.

Figure 4B:
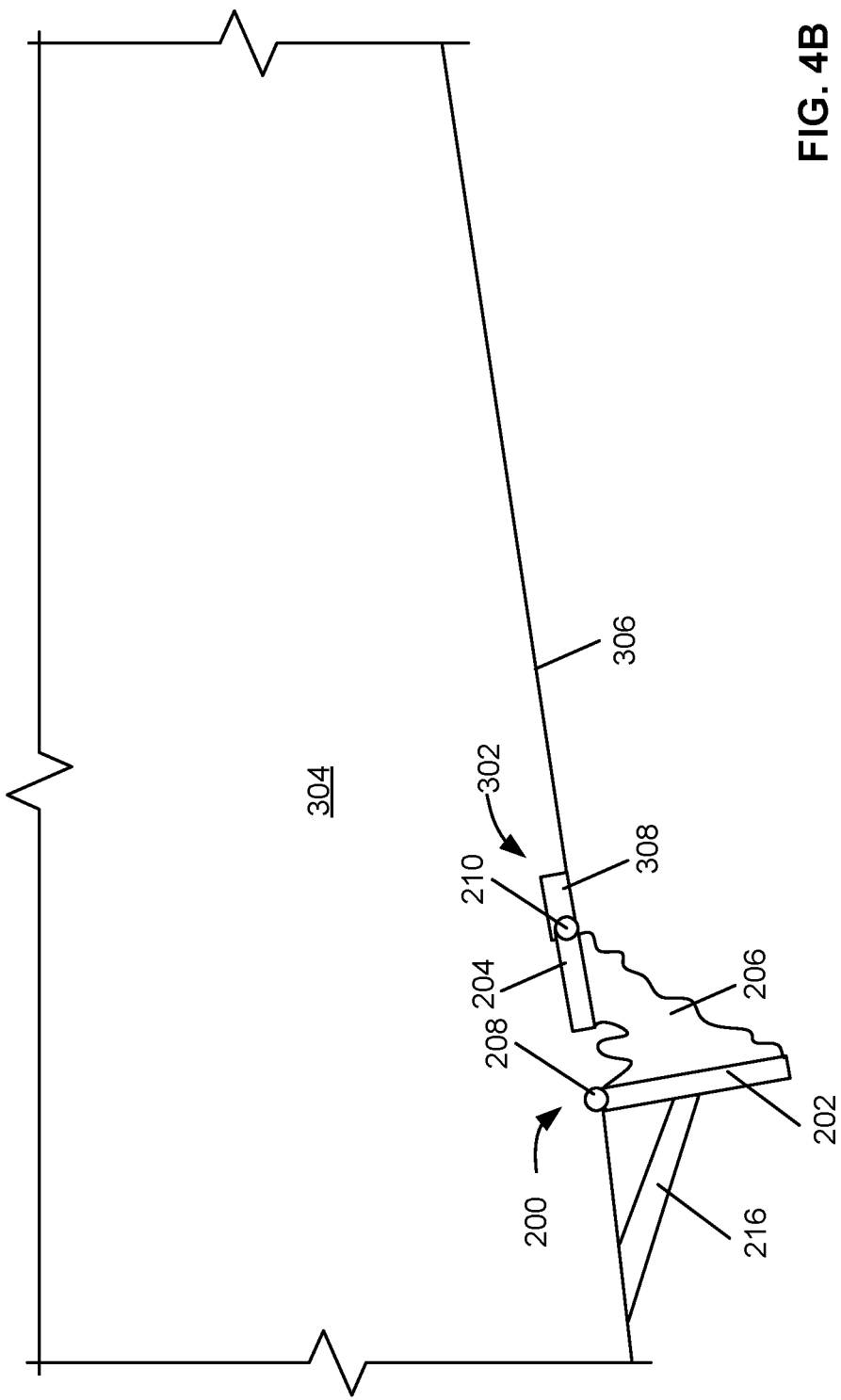

FIGS. 4A-4C depict an alternative deployment and use of the example apparatus 200 described herein. FIG. 4A depicts an alternative implementation of the example apparatus 200 in a storage position similar to that shown in FIG. 3A. FIG. 4B depicts the first loop 202 of the example apparatus 200 in a fully deployed position and the second loop 204 of the example apparatus 200 in a partially deployed position. The second loop 204 slides within the track 308 to move to a fully deployed positon. Unlike the example implementation of the apparatus 200 in FIGS. 3A-3D, the second loop 204 in the alternative implementation of FIGS. 4A-4C does not rotate, but instead translates to direct fluid flow through an aperture 402 within the surface 306 of the aircraft 100.

FIG. 4C depicts a fluid flow path that fluid flowing through the fluid flow channel 206 may follow. In this illustrated example, the fluid flow channel 206 forces air directly into the interior 302 of the aircraft 100. In some examples, the fluid flow may be used to power the emergency power generator 312, as described in conjunction with FIG. 3D. Alternatively, the fluid flow channel 206 device may be operative to force fluid into a fluid compressor (e.g., a cabin air compressor) inlet. In such examples, the additional flow of fluid may facilitate maintenance of cabin pressure in the event of loss of power to the air compressor. In other examples, the flow of fluid into the interior 302 of the aircraft 100 may facilitate ventilation of smoke in a cockpit or cargo area of the example aircraft 100.

Figure 5:
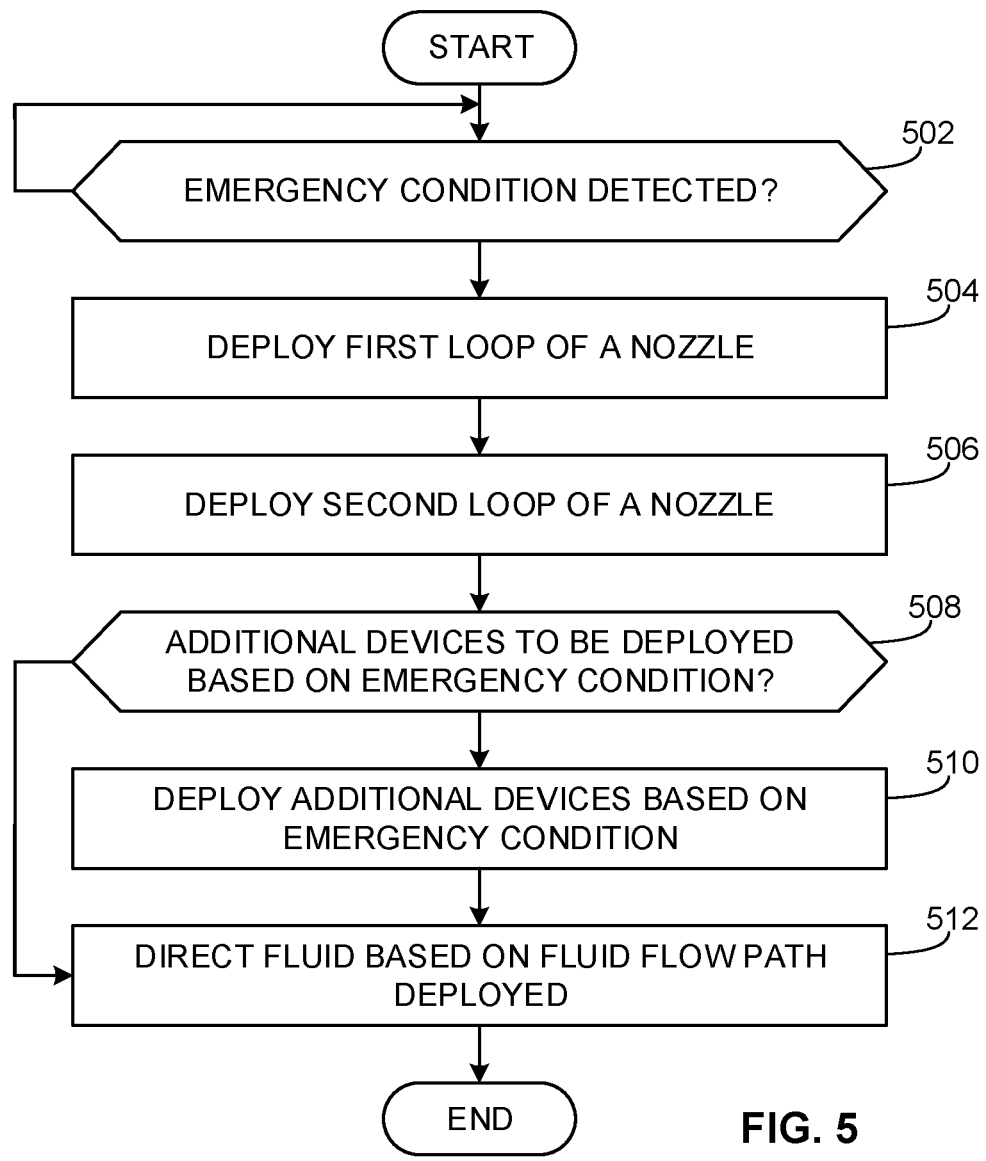
FIG. 5 is a flowchart depicting an example method of deploying the example apparatus.

FIG. 5 is a flowchart depicting an example method 500 of deploying the example apparatus 200. In some examples, the order of execution of the blocks may be changed, and/or some of the blocks described may be changed, eliminated, or combined. The method 500 begins when an emergency condition (e.g., loss of power to cabin air compressor, loss of engine power, smoke, etc.) is detected (block 502). The first loop 202 of the example apparatus 200 is deployed (block 504). The second loop 204 of the example apparatus 200 is also deployed, forming the fluid flow channel 206 (block 506). The method may include determining whether to deploy an additional device (e.g., an emergency power generator, the flow control device 310) based on the type of emergency condition detected (block 508). If an additional device is to be deployed based on the emergency condition, the addition device (e.g., an emergency power generator, the flow control device 310) is deployed (block 510). For example, if the emergency condition is a loops of engine power, the additional device deployed may include an emergency power generator. The fluid flow is directed through the fluid flow path that has been deployed (block 512) and the method 500 is complete.

From the foregoing, it will be appreciated that the above disclosed apparatus and articles of manufacture are operative to deploy a fluid flow channel to redirect fluid flow for emergency services on a vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
    a system for emergency services; and
    a deployable channel, the deployable channel including:
        a first loop pivotably coupled to an outside surface of the aircraft via a fastener, the fastener forming a pivot axis, the first loop being movable between a storage position in which the first loop extends along the outside surface and a deployed position in which the first loop extends outward from the outside surface;
        a second loop coupled to the outside surface of the aircraft and disposed a distance from the first loop; and
        fabric coupled between the first loop and the second loop, wherein the first loop is movable from the storage position to the deployed position to deploy the deployable channel and to couple the deployable channel to the system for the emergency services.

2. The aircraft of claim 1, wherein the system includes an emergency power generator, and wherein a flow of air is to power the emergency power generator.

3. The aircraft of claim 1, wherein the system includes a cabin air compressor to supply pressurized air to a cabin of the aircraft.

4. The aircraft of claim 1, further including a flow control device disposed downstream of the second loop, the flow control device to direct a flow of air from the second loop into an interior of the aircraft toward the system.

5. The aircraft of claim 1, further including a tension line coupled between the outside surface and the first loop to prevent the first loop from moving beyond a predetermined position.

6. The aircraft of claim 1, wherein the first and second loops are wires.

7. The aircraft of claim 1, wherein the fabric is constructed of at least one of nylon, silk, or synthetic fibers.

8. The aircraft of claim 1, wherein the first loop defines a first area and the second loop defines a second area, the first area larger than the second area.

9. The aircraft of claim 1, wherein the system is disposed within an interior of the aircraft.

10. The aircraft of claim 9, wherein the second loop is to direct a flow of air to the system in the interior of the aircraft through an opening in the outside surface of the aircraft.

11. The aircraft of claim 10, wherein the second loop is slidable in a linear direction along the outside surface of the aircraft from a partially deployed position to a fully deployed position in which the second loop is aligned with the opening.

12. The aircraft of claim 7, wherein the fastener is a first fastener, and wherein the second loop is pivotably coupled to the outside surface of the aircraft via a second fastener and pivotable between a storage position and a deployed position.

13. The aircraft of claim 12, wherein, when the second loop is in the storage position, the second loop extends along the outside surface, and when the second loop is in the deployed position, the second loop extends outward from the outside surface.

14. The aircraft of claim 13, wherein the second fastener is slidable in a track.

15. The aircraft of claim 14, wherein the second fastener is to slide in an aft direction when the second loop moves from the storage position to the deployed position.

16. A method comprising:
    detecting an emergency condition of an aircraft; and
    in response to detecting the emergency condition, deploying a channel by rotating a first loop pivotably coupled to an outside surface of the aircraft from a storage position to a deployed position for emergency services, the first loop coupled to a second loop via a fabric, the first loop rotatably coupled to the outside surface of the aircraft via a fastener forming a pivot axis, wherein, when the first loop is in the storage position, the first loop extends along the outside surface, and when the first loop is in the deployed position, the first loop extends outward from the outside surface.

17. The method of claim 16, wherein a fluid flow channel is formed by the channel to direct a flow of air to an emergency system, and wherein the emergency system includes an emergency power generator to be powered by a flow of air.

18. The method of claim 16, wherein a fluid flow channel is formed by the channel to direct a flow of air to an emergency system, and wherein the emergency system includes a cabin air compressor to supply pressurized air to a cabin of the aircraft.

19. The method of claim 16, further including deploying the second loop to form a fluid flow channel.

20. The method of claim 16, wherein the deploying of the first loop includes unlocking the fastener.

* * * * *

UNITED STATES PATENT AND TRADEMARK OFFICE
CERTIFICATE OF CORRECTION

| | | |
|---|---|---|
| PATENT NO. | : 11,248,627 B2 | Page 1 of 1 |
| APPLICATION NO. | : 16/598817 | |
| DATED | : February 15, 2022 | |
| INVENTOR(S) | : Richard J. Glenn et al. | |

It is certified that error appears in the above-identified patent and that said Letters Patent is hereby corrected as shown below:

In the Claims

Column 6, Line 14 (Claim 12): replace "claim 7" with --claim 1--

Signed and Sealed this
Twenty-eighth Day of June, 2022

Katherine Kelly Vidal
*Director of the United States Patent and Trademark Office*